United States Patent [19]
Furukawa et al.

[11] Patent Number: 4,758,484
[45] Date of Patent: Jul. 19, 1988

[54] NON-AQUEOUS SECONDARY CELL

[75] Inventors: Nobuhiro Furukawa, Hirakata; Toshihiko Saito, Tsuzukigun; Toshiyuki Nohma, Kyoto, all of Japan

[73] Assignee: Sanyo Electric Co., Ltd., Osaka, Japan

[21] Appl. No.: 113,855

[22] Filed: Oct. 29, 1987

[30] Foreign Application Priority Data

Oct. 30, 1986 [JP] Japan .................. 61-258940

[51] Int. Cl.$^4$ ............................................. H01M 6/14
[52] U.S. Cl. ..................................... 429/194; 429/197; 429/224
[58] Field of Search ............... 429/194, 196, 197, 224, 429/218; 423/605, 49

[56] References Cited

U.S. PATENT DOCUMENTS

| | | | |
|---|---|---|---|
| 4,133,856 | 1/1979 | Ikeda et al. | 264/63 |
| 4,336,315 | 6/1982 | Eda et al. | 429/194 |
| 4,482,613 | 11/1984 | Turchan et al. | 429/197 X |
| 4,690,877 | 9/1987 | Gabano et al. | 429/194 |

FOREIGN PATENT DOCUMENTS

49-25571 7/1974 Japan .

Primary Examiner—Anthony Skapars
Attorney, Agent, or Firm—Armstrong, Nikaido, Marmelstein & Kubovcik

[57] ABSTRACT

A non-aqueous secondary cell is provided which is repeatedly chargeable and dischargeable. This cell comprises, as main components thereof, a negative electrode, a positive electrode, and a separator disposed between the negative and positive electrode and impregnated with an electrolyte. The negative electrode has lithium or lithium alloy as the active material. The positive electrode has manganese dioxide as the active material and contains $Li_2MnO_3$.

19 Claims, 15 Drawing Sheets

○ Li2MnO
× MnO

NON-AQUEOUS SECONDARY CELL

BACKGROUND OF THE INVENTION

(1) Field of the Invention

The present invention relates to a non-aqueous secondary cell in which lithium or lithium alloy is used as the active material for the negative electrode, and particularly to an improvement in the positive electrode.

(2) Description of the Prior Art

Molybdenum trioxide, vanadium pentoxide and niobic sulfide have been proposed as the active material for the positive electrode of this type of secondary cell, but these substances have not been put to practical use to date.

For the positive electrode of the non-aqueous primary cell, on the other hand, manganese dioxide and carbon fluoride are known to be typical examples of active material and are actually employed for the purpose. Manganese dioxide has the advantages of being excellent in storage characteristics, abundant in the earth and inexpensive.

As the crystal structure of manganese dioxide suited for the positive electrode, $\gamma$-$\beta$MNO$_2$ heat-treated at temperatures of 250°–350° C. has been proposed as in Japanese Patent Publication No. 49-25571. This $\gamma$-$\beta$MnO$_2$, however, is unsatisfactory in reversibility and has the problem of lowering charge and discharge characteristics. The reason will be explained with reference to FIGS. 1a–1e of the accompanying drawings showing X-ray diffraction patterns.

Figure 1A:
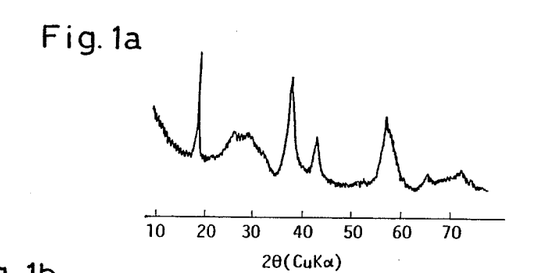
FIG. 1a shows a diffraction pattern prior to charging and discharging.
Figure 1B:
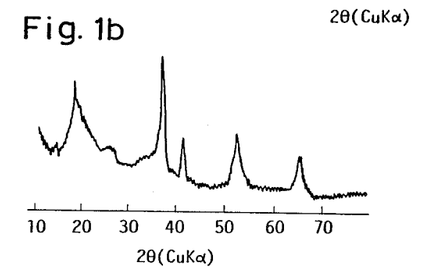
FIGS. 1b and 1c show diffraction patterns at a 10th discharge and a subsequent charge, respectively.
Figure 1C:
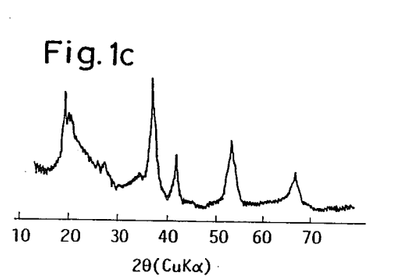
Figure 1D:
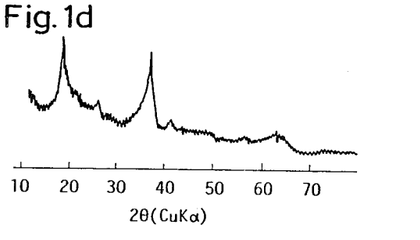
FIGS. 1d and 1e show diffraction patterns at a 100th discharge and a subsequent charge, respectively.
Figure 1E:
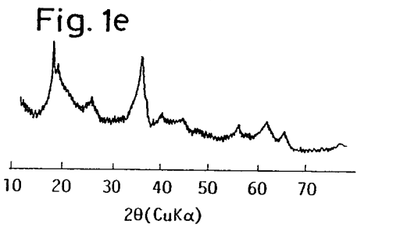

FIG. 1a shows a diffraction pattern prior to charging and discharging. FIGS. 1b and 1c show diffraction patterns at a 10th discharge and charge, respectively. Compared with the pattern of FIG. 1a, it will be seen that the patterns of FIGS. 1b and 1c show the angles of diffraction shifting to a lower side and the peaks becoming less sharp. These trends are more conspicuous and the peaks are almost leveled out in the patterns at a 100th discharge and charge shown in FIGS. 1d and 1e, respectively. It may be deduced from the above that a repetition of charges and discharges results in widening of the bond length between manganese and oxygen and in loosening of the crystal structure of manganese dioxide. Consequently, the manganese dioxide has poor reversibility and charge and discharge characteristics.

This applies also to $\beta$-MnO$_2$ heat-treated at temperatures of 350°–430° C. as disclosed in U.S. Pat. No. 4,133,856.

Thus, manganese dioxide is desirable as the active material for the positive electrode of the non-aqueous secondary cell, but involves difficulties in practice.

SUMMARY OF THE INVENTION

The object of the present invention, therefore, is to improve the reversibility of manganese dioxide without impairing the advantages of manganese dioxide, i.e. excellent storage characteristics, availability in abundance and low cost, thereby to improve charge and discharge cycle characteristics of the non-aqueous manganese dioxide-lithium secondary cell.

The above object is fulfilled by a repeatedly chargeable and dischargeable non-aqueous secondary cell comprising a negative electrode having lithium or lithium alloy as an active material, a positive electrode having manganese dioxide as an active material, the positive electrode including Li$_2$MnO$_3$, a separator disposed between the positive electrode and the negative electrode, and a non-aqueous electrolyte.

The above Li$_2$MnO$_3$ is obtained by heat-treating a mixture of manganese dioxide and lithium salt.

Specifically, the lithium salt is selected from the group consisting of lithium hydroxide, lithium nitrate, lithium phosphate, lithium carbonate and lithium oxide.

The lithium salt and manganese dioxide are mixed in a lithium-manganese molar ratio range of 10:90 to 70:30.

The mixture of manganese dioxide and lithium salt is heat-treated in a temperature range of 300°–430° C., preferably 350°–430° C.

The positive electrode is formed by heat-treating a mixture of manganese dioxide and lithium salt to produce manganese dioxide and Li$_2$MnO$_3$, thereafter adding a conductive agent and a binder, and pressurizing and heat-treating a resulting mixture.

The positive electrode may also be formed by heat-treating a mixture of manganese dioxide and lithium salt to produce manganese dioxide and Li$_2$MnO$_3$, thereafter adding further manganese dioxide, a conductive agent and a binder, and pressurizing and heat-treating a resulting mixture.

Alternatively, the positive electrode may be formed by heat-treating a mixture of manganese dioxide and lithium salt to produce Li$_2$MnO$_3$, thereafter adding manganese dioxide, a conductive agent and a binder, and pressurizing and heat-treating a resulting mixture.

According to the present invention, the positive electrode includes Li$_2$MnO$_3$ in addition to manganese dioxide constituting the active material. This composition prevents widening of the bond length between manganese and oxygen in the manganese dioxide and loosening of the crystal structure of the manganese dioxide. Thus, the present invention provides an improvement in the reversibility and charge and discharge characteristics.

BRIEF DESCRIPTION OF THE DRAWINGS

FIGS. 1a–1e are views showing diffraction patterns where charges and discharges are repeated on a cell having a positive electrode formed of $\gamma$-$\beta$MnO$_2$, wherein FIGS. 4a–4e are views showing diffraction patterns where charging and discharging are repeated on the cell according to the present invention, wherein

DETAILED DESCRIPTION OF THE INVENTION

EXAMPLE 1

Figure 2:
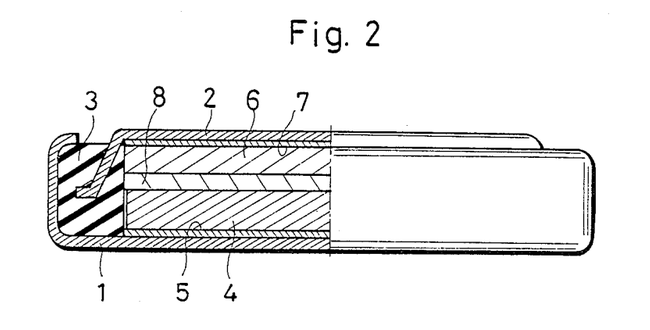
FIG. 2 is a half section of a cell according to the present invention.

A first example embodying the present invention will be described hereinafter with reference to a flat type non-aqueous secondary cell as shown in FIG. 2.

The illustrated cell comprises positive and negative cans 1 and 2 formed of stainless steel and separated from each other by an insulating packing 3 formed of polypropylene. Number 4 indicates a positive electrode constituting the gist of this invention, which is pressed upon a positive collector 5 secured to a bottom inside surface of the positive can 1. Number 6 indicates a negative electrode pressed upon a negative collector 7 secured to a bottom inside surface of the negative can 2. Number 8 indicates a separator comprising a porous membrane of polypropylene. This cell employs an electrolyte comprising lithium perchlorate dissolved in 1 mol/liter in a solvent mixture of propylene carbonate and dimethoxyethane.

The positive and negative electrodes are prepared as follows:

80 grams of chemical manganese dioxide having an average particle size not exceeding 30 micron and 20 grams of lithium hydroxide are first mixed in a mortar, and then heat-treated in the air at 375° C. for twenty hours. This heat treatment produces a mixture in which manganese dioxide and $Li_2MnO_3$ coexist. The reaction formula for the $Li_2MnO_3$ production is as follows:

$$MnO_2 + 2LiOH \rightarrow Li_2MnO_3 + H_2O \quad (1)$$

Next, the active material powder thus obtained is mixed with acetylene black acting as conductive agent and fluoric resin powder acting as binder in a weight ratio of 90:6:4 to produce a blend for forming the positive electrode. This blend is molded under a pressure of 2 tons/cm² into a shape having a 20 mm diameter, and then heat-treated at 250° C., whereby the positive electrode is completed. The negative electrode, on the other hand, is prepared by punching a piece 20 mm in diameter out of a lithium foil having a selected thickness.

Incidentally, the cell is 24.0 mm in diameter and 3.0 mm in thickness. This cell embodying the present invention is hereinafter referred to as Cell A1.

EXAMPLE 2

A positive electrode is produced in the same way as in EXAMPLE 1 except that 60 grams of lithium carbonate are used instead of the 20 grams of lithium hydroxide. This cell is hereinafter referred to as Cell A2.

The reaction formula for the $Li_2MnO_3$ production in this example is as follows:

$$MnO_2 + Li_2CO_3 \rightarrow Li_2MnO_3 + CO_2$$

COMPARATIVE EXAMPLE 1

A positive electrode is produced in the same way as in EXAMPLE 1 except that the lithium salt is not added. This cell produced for comparison purposes is hereinafter referred to as Cell B1.

COMPARATIVE EXAMPLE 2

Manganese dioxide is added and mixed with lithium hydroxide as in EXAMPLE 1 but, as distinct from EXAMPLE 1, the mixture is not heat-treated here. The cell thus produced is hereinafter referred to as Cell B2.

Figure 3:
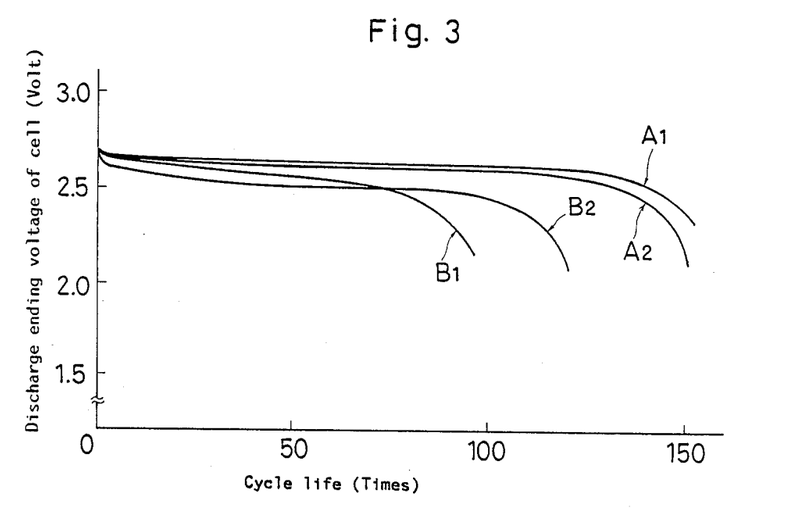
FIG. 3 is a view showing charge and discharge characteristics of the cell.

FIG. 3 shows charge and discharge cycle characteristics of these cells. The data were obtained from the conditions that the discharge was carried out in a current of 3 mA for four hours, the charge in the current of 3 mA, and the charge ending voltage was 4.0 V.

It will be seen from FIG. 3 that discharge ending voltages of Cells B1 and B2 drop sharply around the 100th cycle whereas those of Cells A1 and A2 embodying the present invention do not show sharp drops up to the vicinity of 150 cycles. This demonstrates an improvement in the cycle characteristics. From the characteristics of Cells B1 and B2 produced for comparison purposes, it is understood that the addition of lithium salt would not produce a satisfactory result for improving the cycle characteristics unless it is present in the positive electrode in the form of $Li_2MnO_3$.

The reason for the improvement in the cycle characteristics will be explained next with reference to FIGS. 4a–4e.

Figure 4A:
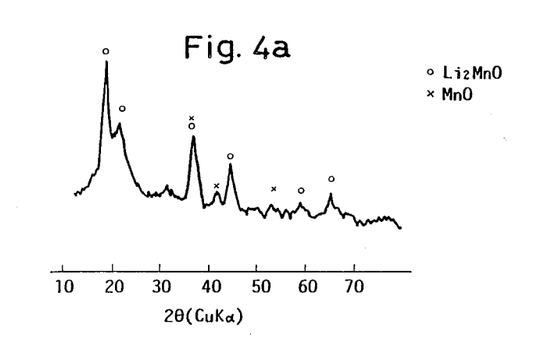
FIG. 4a shows a diffraction pattern prior to charging and discharging.
Figure 4B:
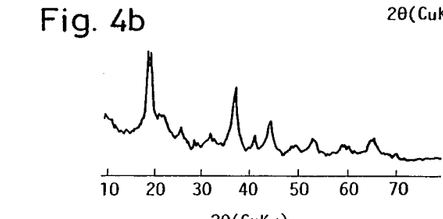
FIGS. 4b and 4c show diffraction patterns at a 10th discharge and a subsequent charge, respectively.
Figure 4C:
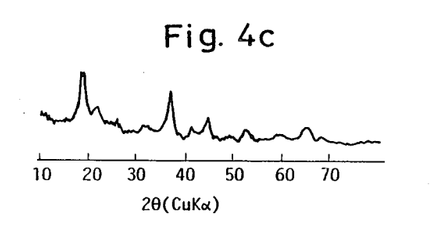
Figure 4D:
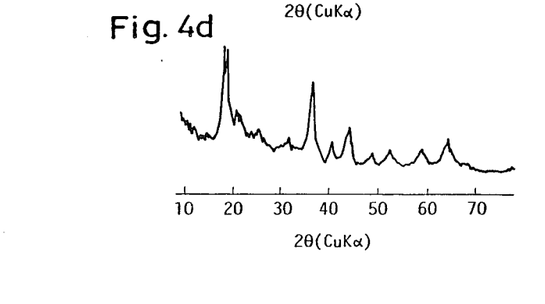
FIGS. 4d and 4e show diffraction patterns at a 100th discharge and a subsequent charge, respectively.
Figure 4E:
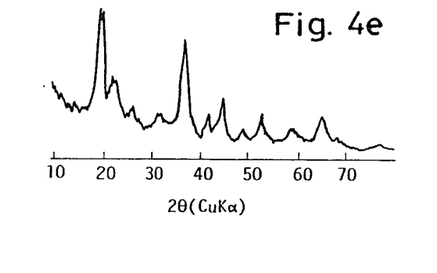

Compared with the a diffraction pattern prior to charging and discharging shown in FIG. 4a, diffraction patterns at a 10th cycle discharge and a subsequent charge shown in FIGS. 4b and 4c indicate no weakening of the peaks and no shift of diffraction angles. This is true also of diffraction patterns at a 100th cycle discharge and a subsequent charge shown in FIGS. 4d and 4e. This demonstrates that the bond length between manganese and oxygen does not increase and the crystal structure of manganese dioxide does not become loose with a repetition of charges and discharges. Thus, the cells according to the present invention have improved reversibility and charge and discharge characteristics.

Heat treatment temperatures for producing $Li_2MnO_3$ have been checked, and the results will be described hereinafter referring to the X-ray diffraction patterns shown in FIGS. 5 through 9. In these tests lithium and manganese were mixed in a fixed ratio of 30:70, and LiOH was used as the lithium salt and $MnO_2$ as the manganese oxide.

Figure 5:
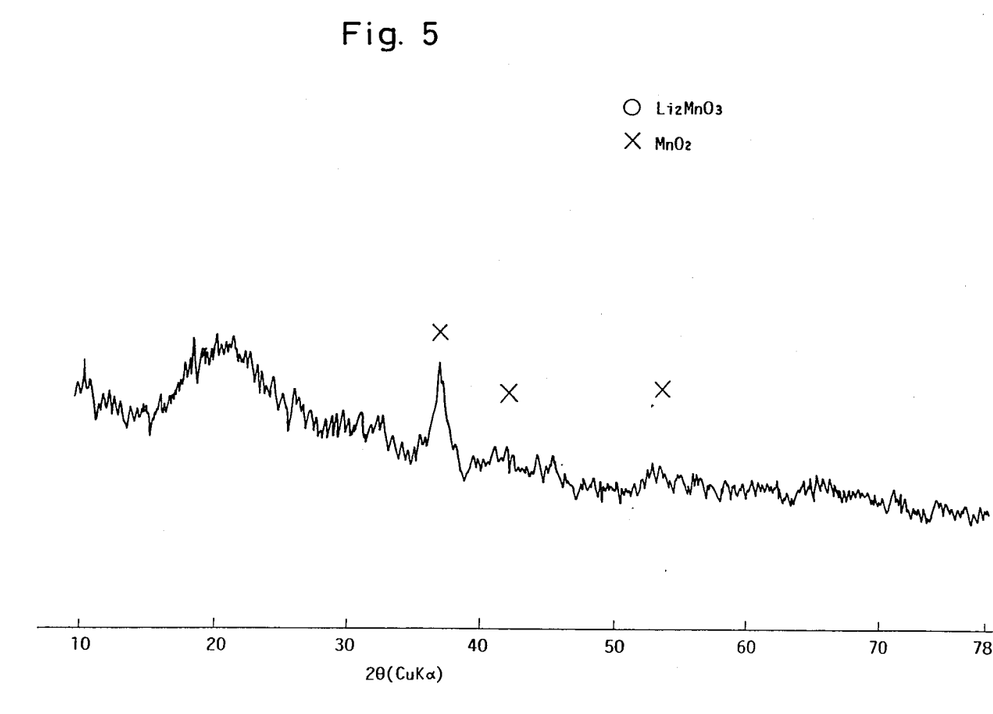
FIGS. 5 through 9 are views showing diffraction patterns for checking heat treatment temperature conditions for preparing Li$_2$MnO$_3$, where heat treatment is effected at temperatures of 250° C., 300° C., 375° C., 430° C., and 500° C., respectively.
Figure 6:
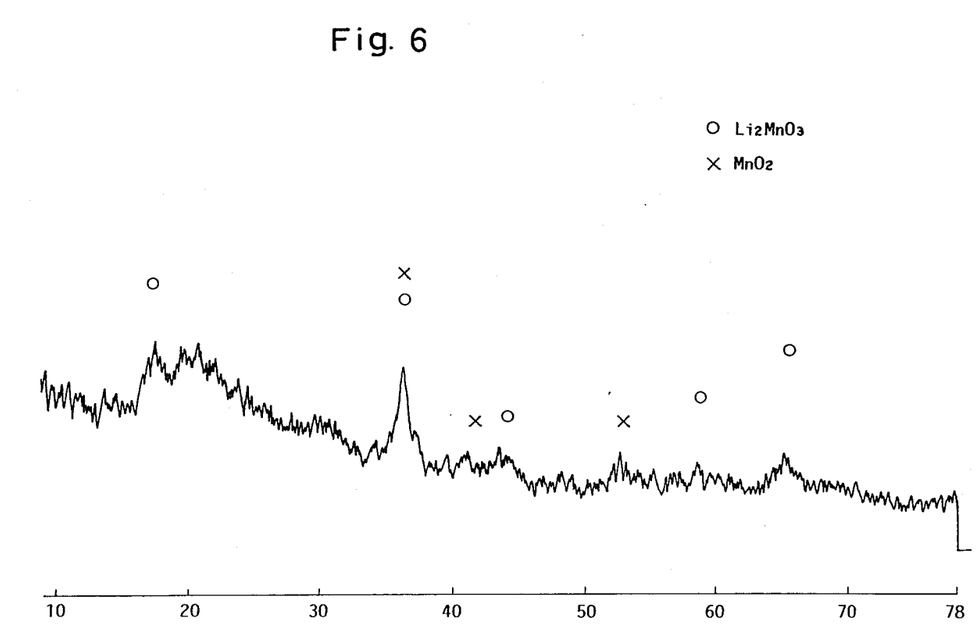
Figure 7:
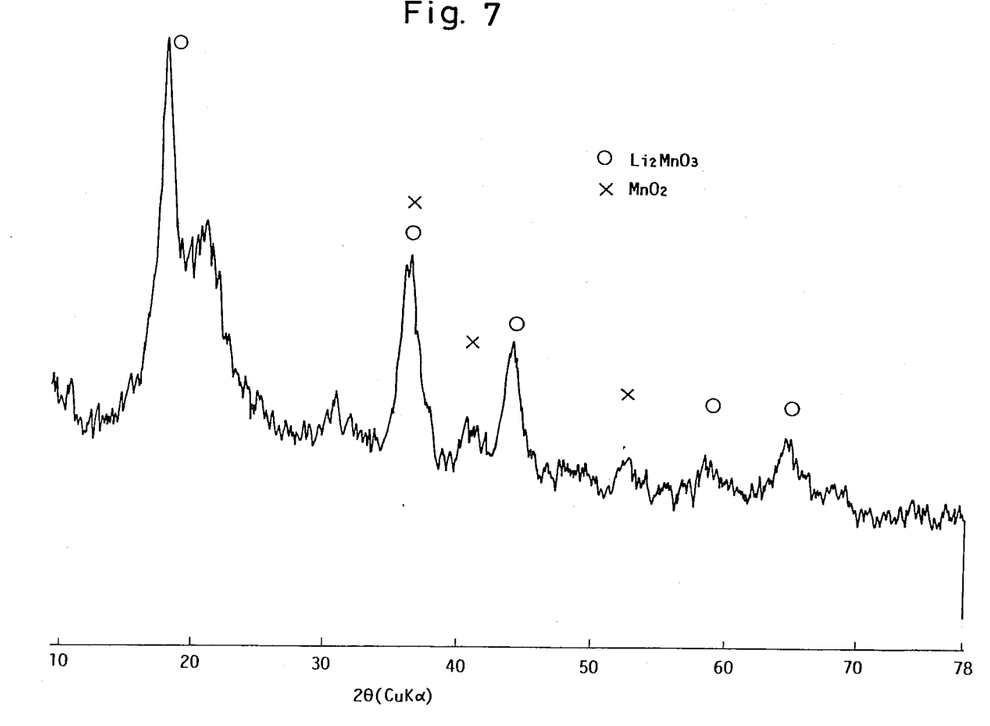
Figure 8:
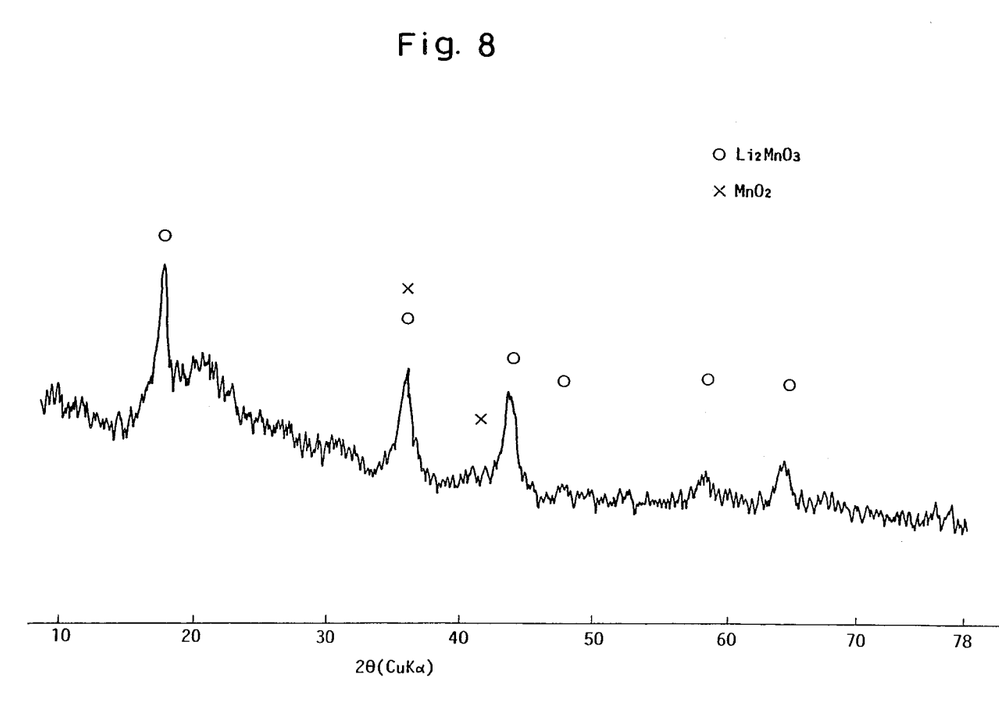
Figure 9:
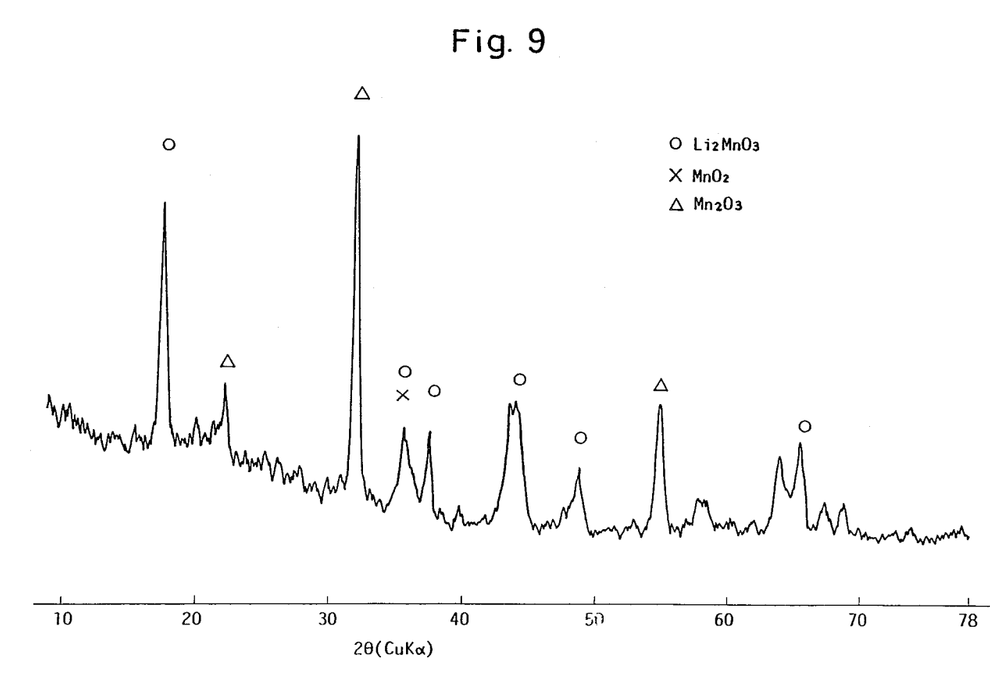

When the heat treatment was carried out at 250° C., $Li_2MnO_3$ was not produced at all as shown in FIG. 5. The reason is considered that no reaction takes place between LiOH and $MnO_2$ at this temperature. Consequently, the heat treatment at this temperature is inadequate for the purpose of the present invention. When the heat treatment was carried out at 300° C., 375° C. and 430° C., $Li_2MnO_3$ was produced and $MnO_2$ remained as shown in FIGS. 6 through 8, respectively. It appears that, in this temperature range, a reaction as expressed in the foregoing formula (1) takes place between LiOH and $MnO_2$, and only $MnO_2$ remains after all LiOH has reacted with $MnO_2$. Consequently, the heat treatment in the temperature range of 300°–430° C. produces the effect of the invention to the full. Further, when the heat treatment was carried out at 500° C., $Li_2MnO_3$ was produced and $MnO_2$ remained, but $Mn_2O_3$ which is an undesirable cell material was produced as a result of decomposition of $MnO_2$ as shown in FIG. 9. Consequently the heat treatment at this temperature fails to produce the effect of the invention.

The above test results prove that the desirable temperature range for the heat treatment is from 300° C. to 430° C.

The heat treatment carried out in the temperature range of 300°–430° C. has the advantage of producing $Li_2MnO_3$ and dehydrating $MnO_2$ acting as the active material.

Where the heat treatment for producing $Li_2MnO_3$ is aimed at removal of combined water in manganese dioxide, it is desirable to carry out the heat treatment in the temperature range of 350°–430° C.

Furthermore, molar ratios between lithium and manganese for producing $Li_2MnO_3$ were checked and the results will be described hereinafter referring to the X-ray diffraction patterns shown in FIGS. 10 through 16. In these tests the heat treatment temperature was fixed to 375° C., and LiOH was used as the lithium salt and $MnO_2$ as the manganese oxide.

Figure 10:
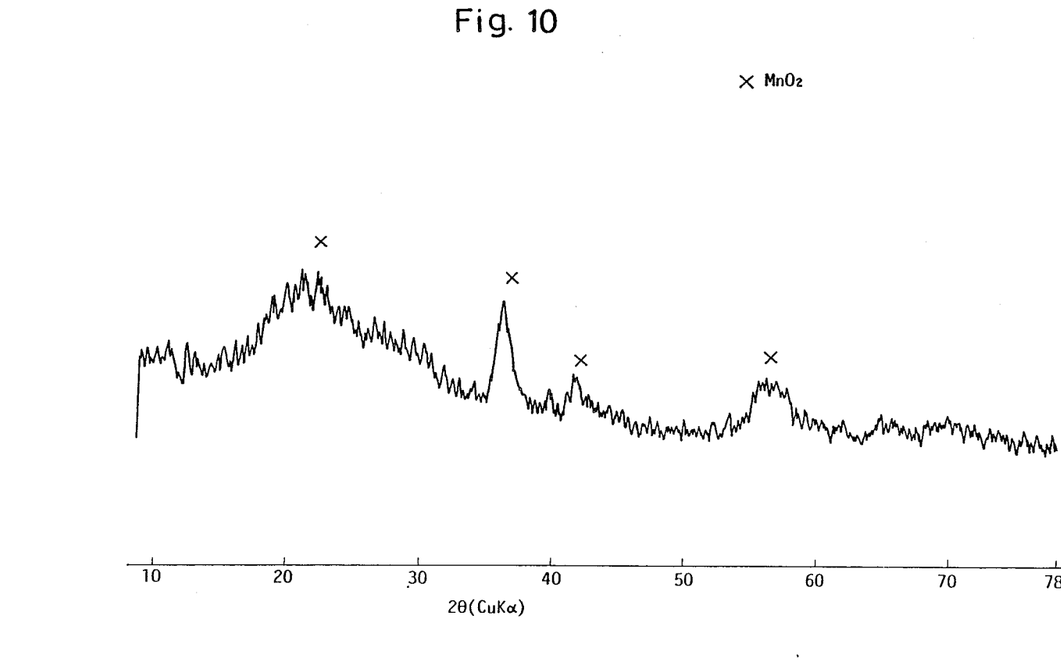
FIGS. 10 through 16 are views showing diffraction patterns for checking molar ratios between Li and Mn for producing Li$_2$MnO$_3$, where Li and Mn are mixed in the ratios of 5:95, 10:90, 20:80, 30:70, 50:50, 70:30, and 85:15, respectively.
Figure 11:
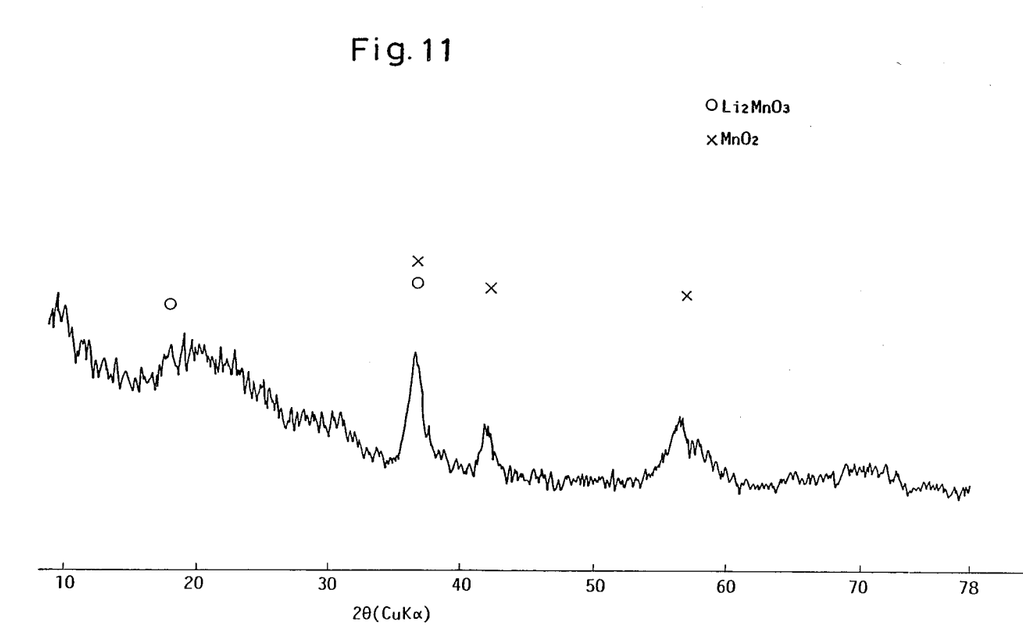
Figure 12:
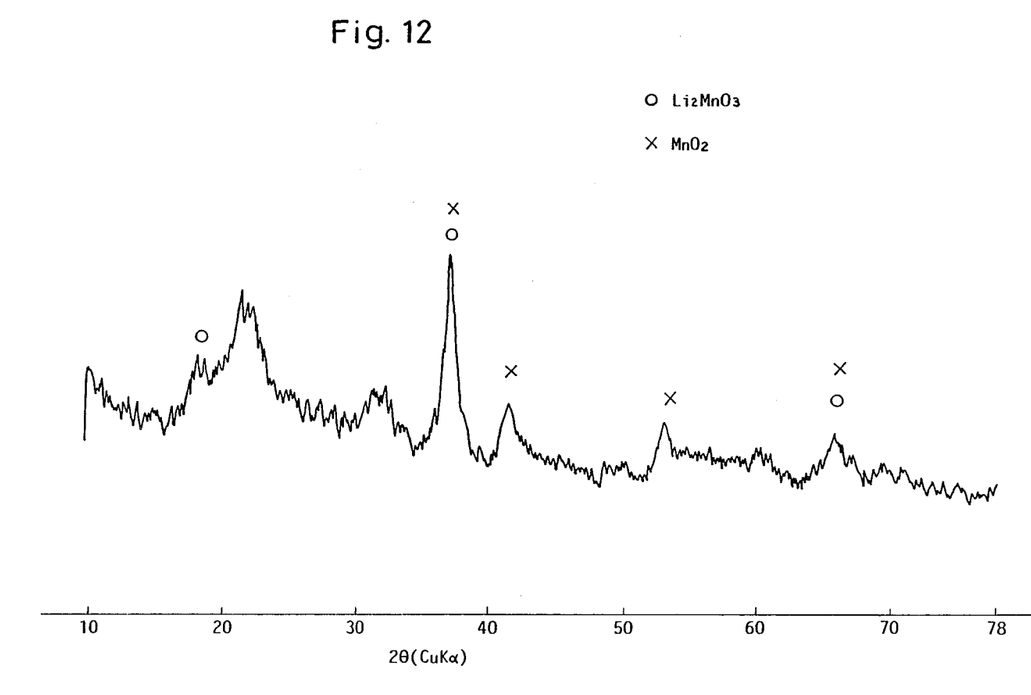
Figure 13:
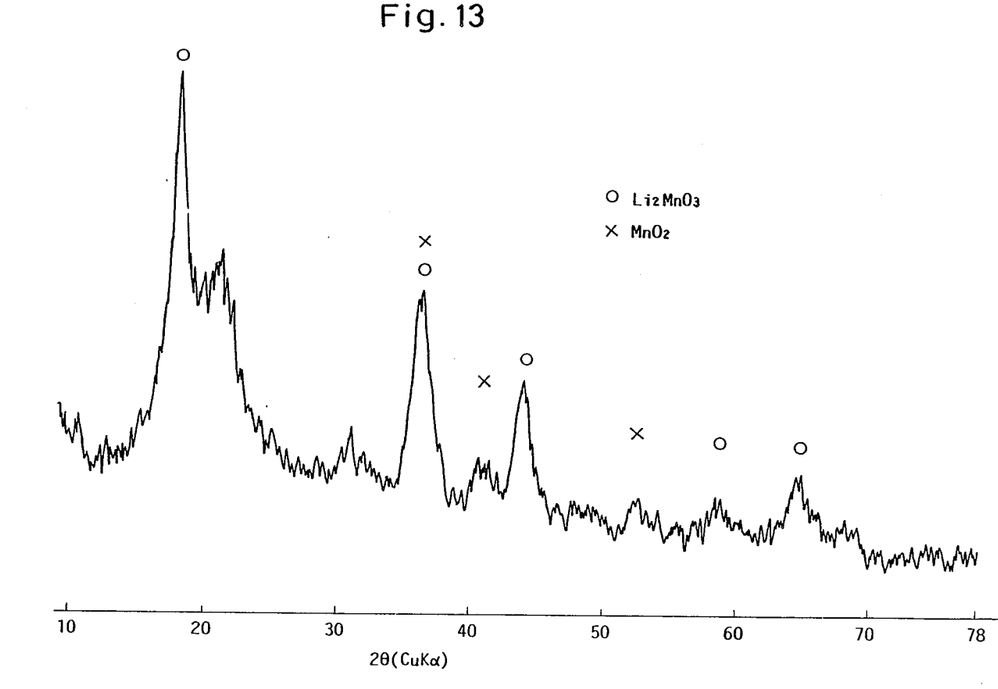
Figure 14:
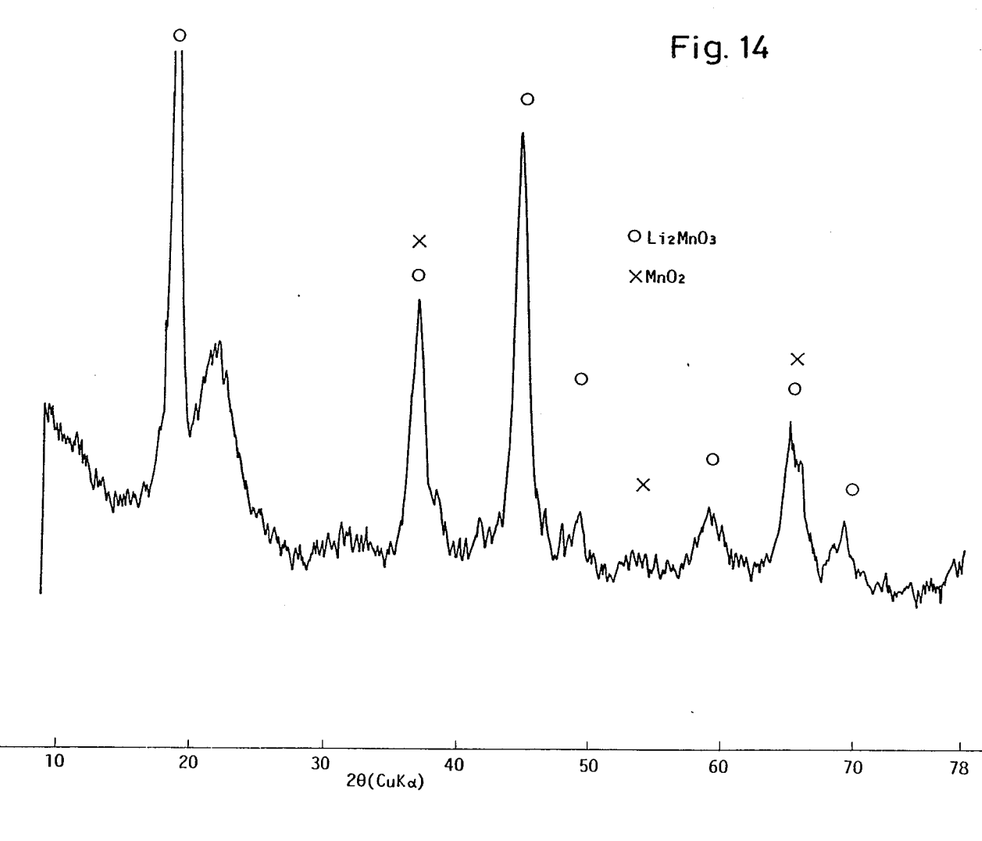

When lithium and manganese were mixed in a molar ratio of 5:95, $Li_2MnO_3$ was not produced at all as shown in FIG. 10. Consequently, the molar ratio of 5:95 between lithium and manganese does not accomplish the purpose of the present invention. When the lithium and manganese were mixed in molar ratios of 10:90, 20:80, 30:70, 50:50, and 70:30, $Li_2MnO_3$ was produced as shown in FIGS. 11 through 15, respectively. This is because, in this range of mixing ratios, the reaction expressed in the formula (1) takes place between LiOH and $MnO_2$. Consequently, mixing of lithium and manganese in the molar ratio of 10:90 to 70:30 produces the effect of the invention to the full. Further, when the lithium and manganese were mixed in a molar ratio of 85:15, $Li_2MnO_3$ was produced but LiOH which is an undesirable cell material remained as shown in FIG. 16. Consequently the mixing lithium and manganese in this molar ratio fails to produce the effect of the invention.

The above test results prove that the desirable molar ratio range between lithium and manganese is from 10:90 to 70:30.

Figure 15:
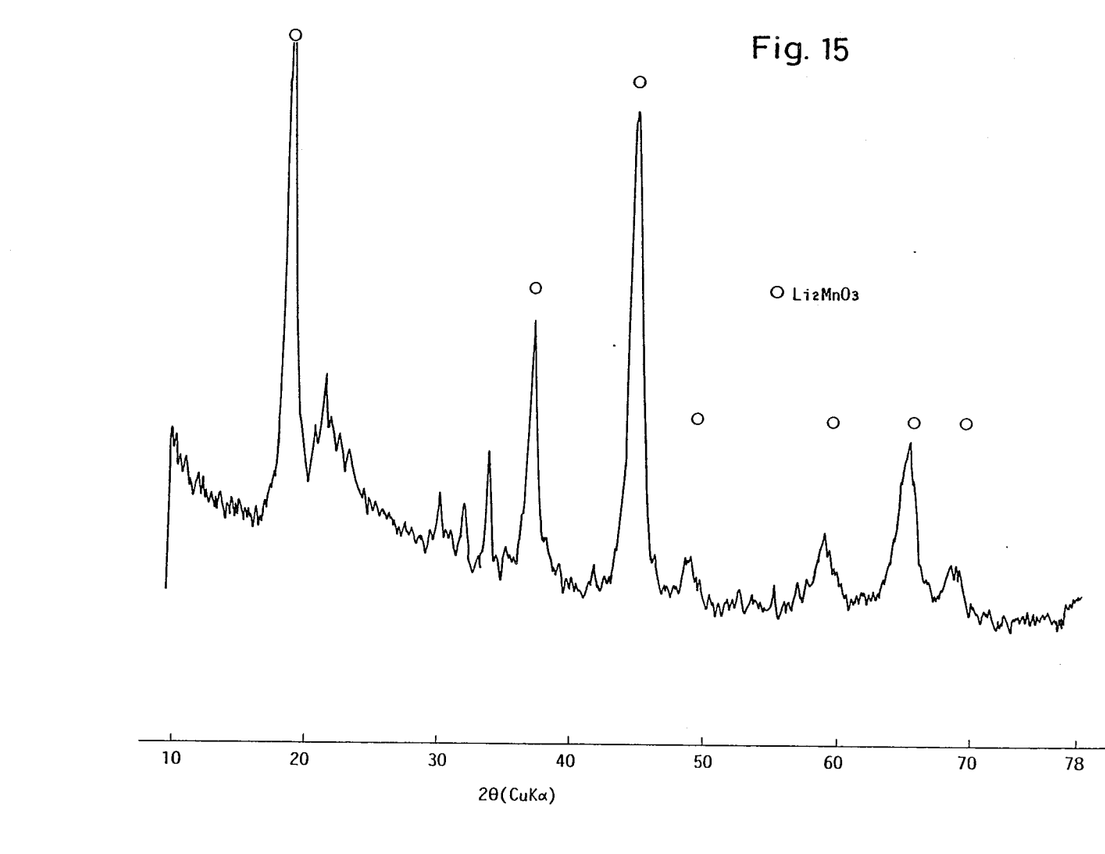
Figure 16:
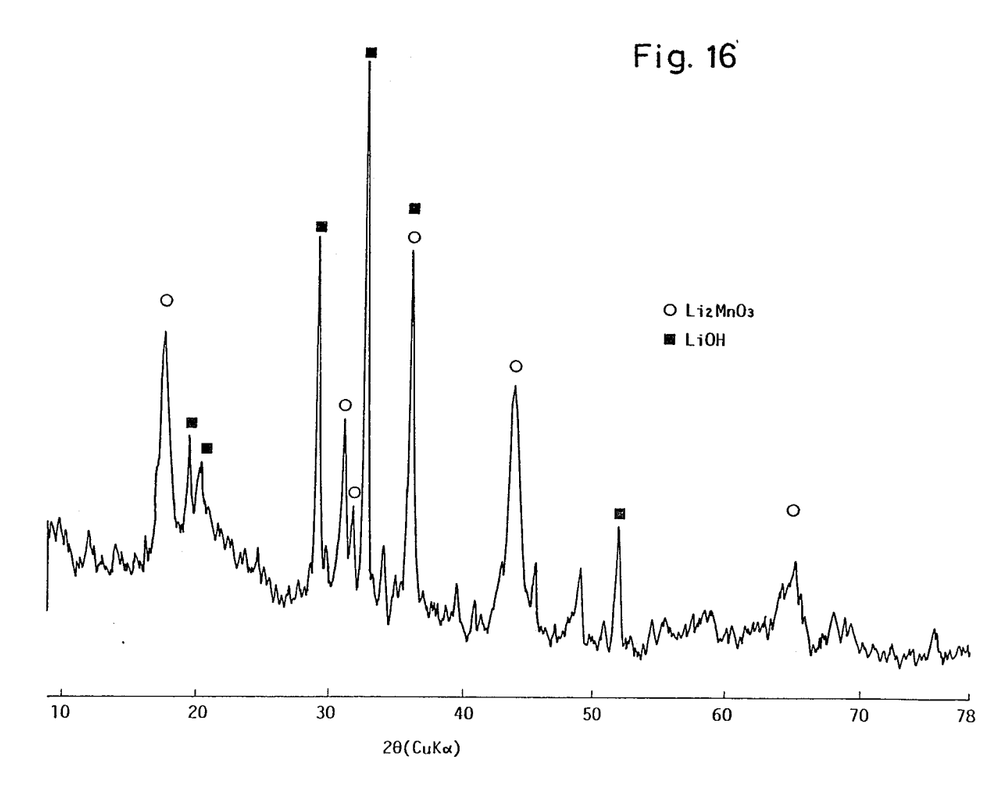

When lithium and manganese were mixed in the molar ratio of 70:30, $Li_2MnO_3$ was produced but $MnO_2$ was not as shown in FIG. 15. Even so, the purpose of the invention will be fulfilled by adding $MnO_2$ after producing $Li_2MnO_3$. Further, it is possible to vary the ratio between $Li_2MnO_3$ and $MnO_2$ by mixing lithium and manganese in the molar ratio range of 10:90 to 70:30 to produce $Li_2MnO_3$ and thereafter adding $MnO_2$.

In obtaining $Li_2MnO_3$ by heat-treating the mixture of manganese dioxide and lithium salt as in this invention, the lithium salt is not limited to those given in the foregoing examples but may comprise lithium nitrate, lithium phosphate or lithium oxide.

The type of manganese dioxide is not limited to chemical manganese dioxide but may of course comprise natural manganese dioxide or electrolytic manganese dioxide.

Furthermore, the present invention is applicable not only to the non-aqueous electrolyte cell but to the solid electrolyte cell also.

What is claimed is:

1. A repeatedly chargeable and dischargeable non-aqueous secondary cell comprising;
   a negative electrode having lithium or lithium alloy as an active material,
   a positive electrode having manganese dioxide as an active material, said positive electrode including $Li_2MnO_3$,
   a separator disposed between said positive electrode and said negative electrode, and
   a non-aqueous electrolyte.

2. A cell as claimed in claim 1 wherein said $Li_2MnO_3$ is obtained by heat-treating a mixture of manganese dioxide and lithium salt.

3. A cell as claimed in claim 2 wherein said lithium salt is selected from the group consisting of lithium hydroxide, lithium nitrate, lithium phosphate, lithium carbonate and lithium oxide.

4. A cell as claimed in claim 2 wherein said lithium salt and manganese dioxide are mixed in a lithium-manganese molar ratio range of 10:90 to 70:30.

5. A cell as claimed in claim 2 wherein said mixture of manganese dioxide and lithium salt is heat-treated in a temperature range of 300°–430° C., preferably 350°–430° C.

6. A cell as claimed in claim 1 wherein said positive electrode is formed by heat-treating a mixture of manganese dioxide and lithium salt to produce manganese dioxide and $Li_2MnO_3$, thereafter adding a conductive agent and a binder, and pressurizing and heat-treating a resulting mixture.

7. A cell as claimed in claim 1 wherein said positive electrode is formed by heat-treating a mixture of manganese dioxide and lithium salt to produce manganese dioxide and $Li_2MnO_3$, thereafter adding further manganese dioxide, a conductive agent and a binder, and pressurizing and heat-treating a resulting mixture.

8. A cell as claimed in claim 1 wherein said positive electrode is formed by heat-treating a mixture of manganese dioxide and lithium salt to produce $Li_2MnO_3$, thereafter adding manganese dioxide, a conductive agent and a binder, and pressurizing and heat-treating a resulting mixture.

9. A cell as claimed in claim 1 wherein said negative electrode is selected from the group consisting of pure lithium, lithium-aluminum alloy and lithium-magnesium alloy.

10. A cell as claimed in claim 1 wherein said separator comprises a porous membrane of polypropylene.

11. A cell as claimed in claim 1 wherein said electrolyte comprises a liquid mixture formed by dissolving lithium perchlorate in a solvent mixture of propylene carbonate and dimethoxyethane.

12. A cell as claimed in claim 1 wherein said positive electrode is pressed upon a positive collector secured to a bottom inside surface of a positive terminal can.

13. A cell as claimed in claim 1 wherein said negative electrode is pressed upon a negative collector secured to a bottom inside surface of a negative terminal can.

14. A repeatedly chargeable and dischargeable non-aqueous secondary cell comprising;
   a negative electrode having lithium or lithium alloy as an active material,
   a positive electrode having a mixture in which manganese dioxide as an active material and $Li_2MnO_3$ coexist,
   a separator disposed between said positive electrode and said negative electrode, and
   a non-aqueous electrolyte.

15. A cell as claimed in claim 14 wherein said positive electrode is formed by heat-treating a mixture of manganese dioxide and lithium salt to produce manganese dioxide and $Li_2MnO_3$, thereafter adding a conductive agent and a binder, and pressurizing and heat-treating a resulting mixture.

16. A cell as claimed in claim 14 wherein said positive electrode is formed by heat-treating a mixture of manganese dioxide and lithium salt to produce $Li_2MnO_3$, thereafter adding manganese dioxide, a conductive agent and a binder, and pressurizing and heat-treating a resulting mixture.

17. A cell as claimed in claim 14 wherein said negative electrode is selected from the group consisting of pure lithium, lithium-aluminum alloy and lithium-magnesium alloy.

18. A cell as claimed in claim 14 wherein said separator comprises a porous membrane of polypropylene.

19. A cell as claimed in claim 14 wherein said electrolyte comprises a liquid mixture formed by dissolving lithium perchlorate in a solvent mixture of propylene carbonate and dimethoxyethane.

* * * * *